April 16, 1946.  C. T. DARE  2,398,362
ROTARY CUTTER HEAD
Filed April 29, 1942  4 Sheets-Sheet 1
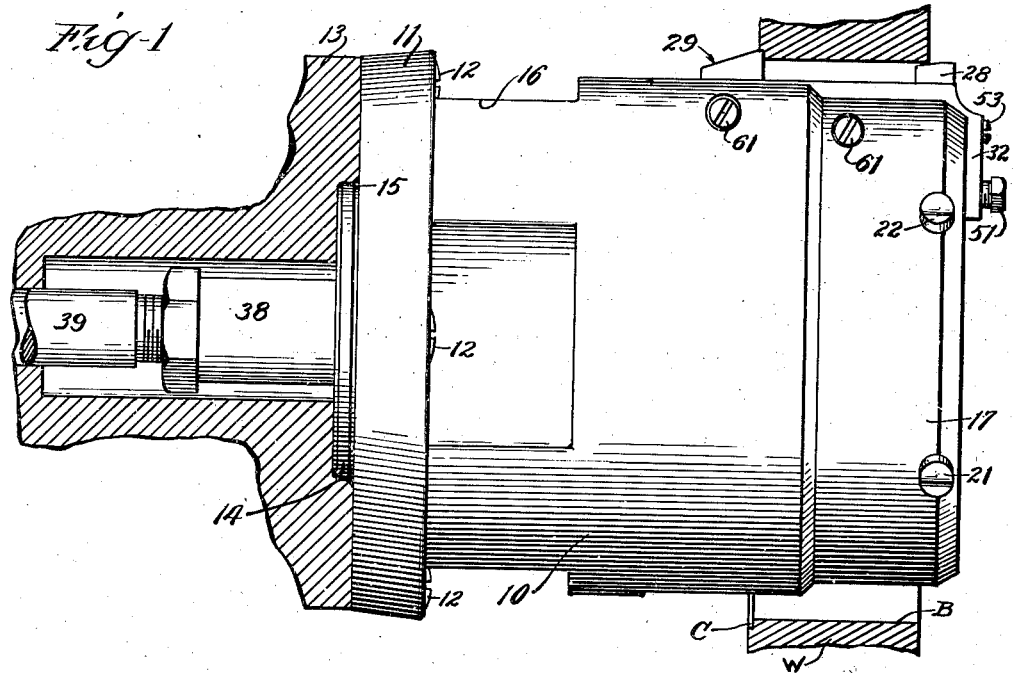
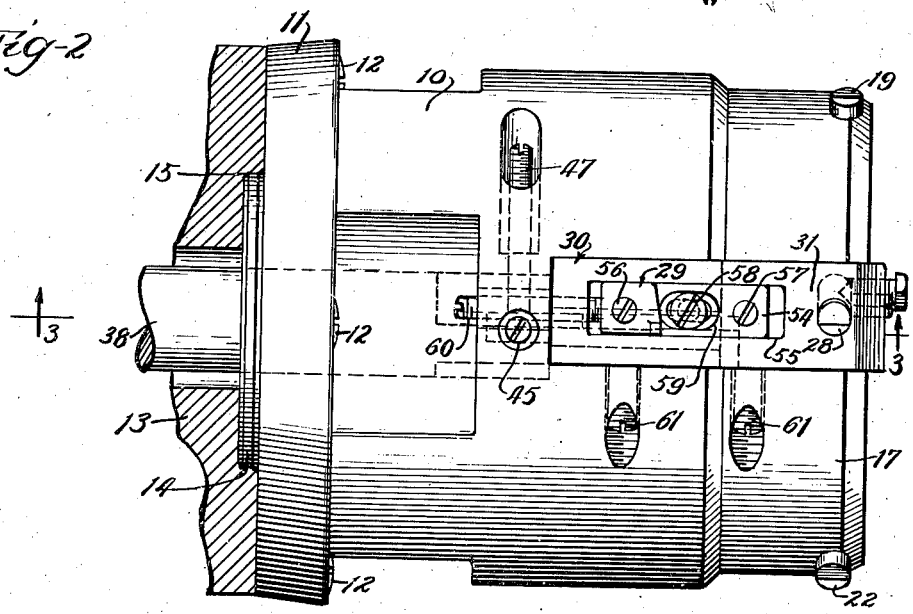
Inventor
Curtis T. Dare
By:- Parker, Carton, Pitzner & Hubbard
Attys.

April 16, 1946.  C. T. DARE  2,398,362
ROTARY CUTTER HEAD
Filed April 29, 1942  4 Sheets-Sheet 2
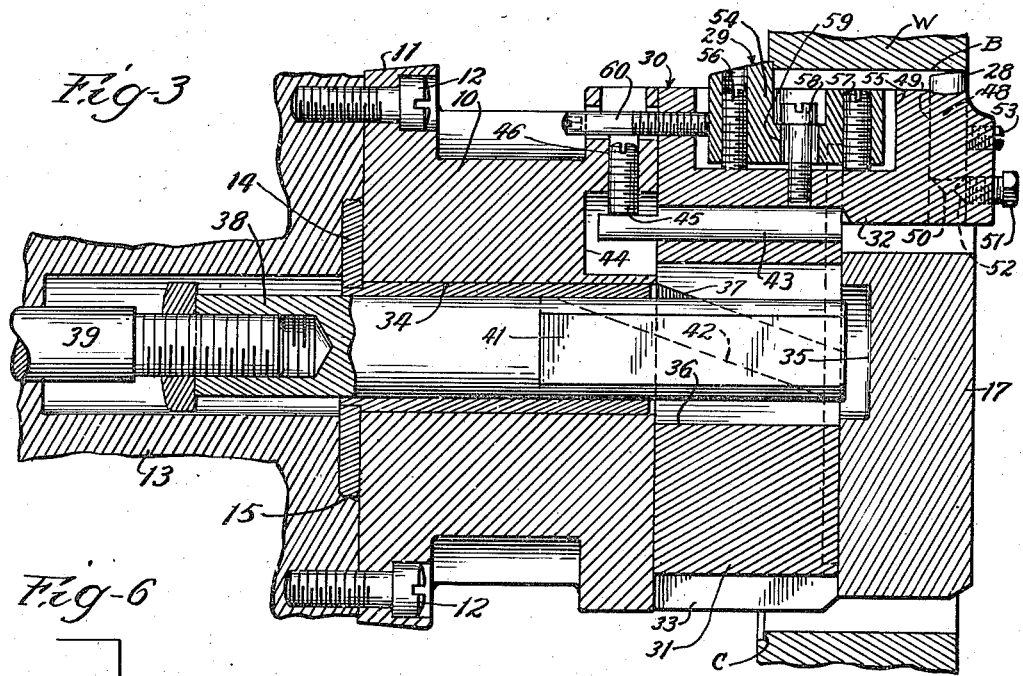
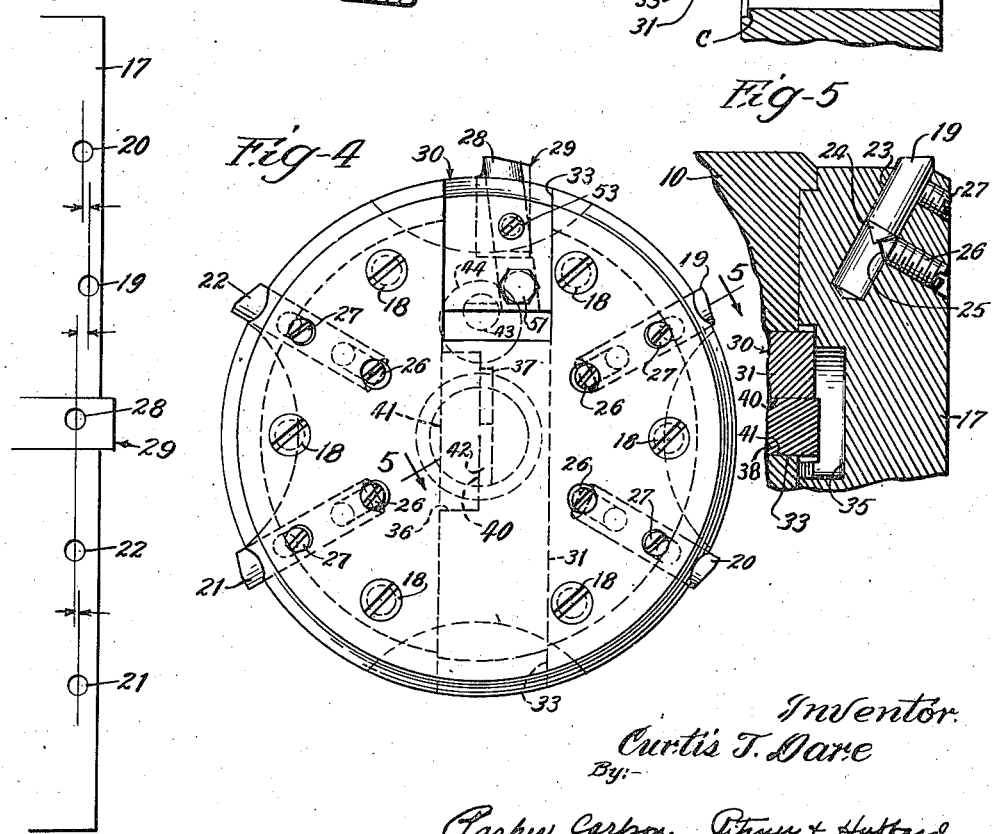
Inventor
Curtis T. Dare

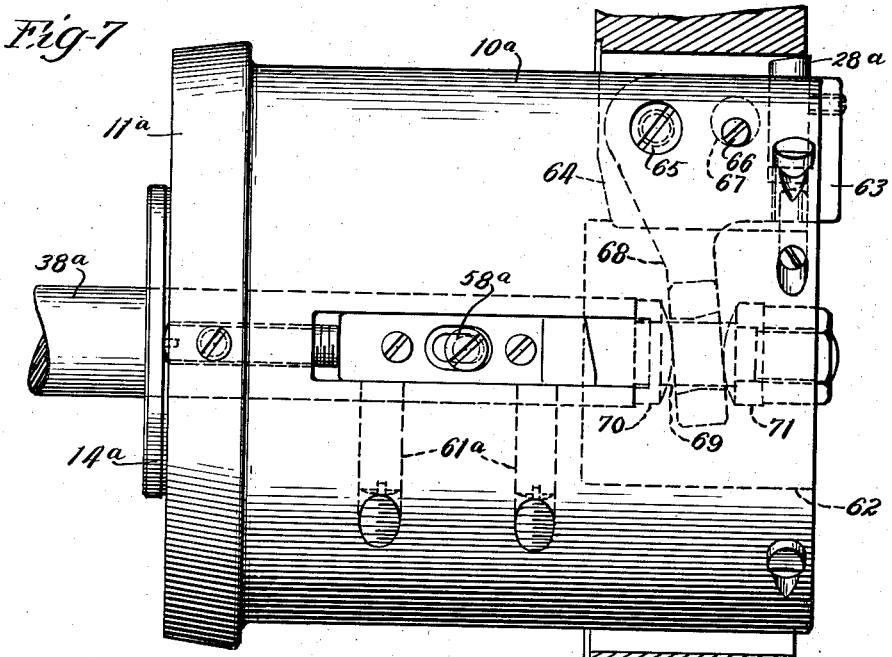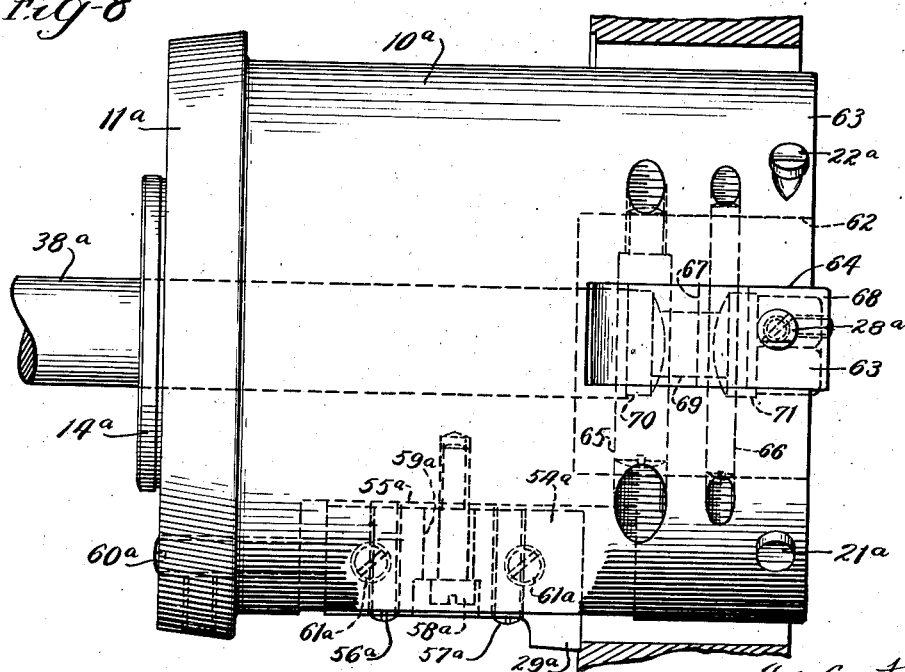

April 16, 1946.  C. T. DARE  2,398,362
ROTARY CUTTER HEAD
Filed April 29, 1942  4 Sheets-Sheet 4
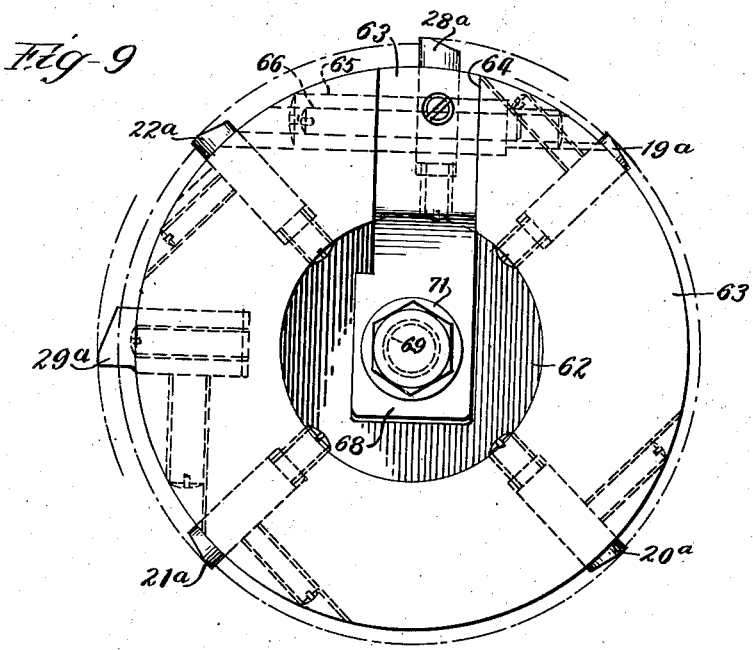

Patented Apr. 16, 1946

2,398,362

UNITED STATES PATENT OFFICE 2,398,362

ROTARY CUTTERHEAD

Curtis T. Dare, Detroit, Mich., assignor to Ex-Cell-O Corporation, Detroit, Mich., a corporation of Michigan Application April 29, 1942, Serial No. 440,963

16 Claims. (Cl. 77—58)

The present invention relates to improvements in rotary cutter heads and has particular reference to a cutter head adapted for such operations as boring, counterboring and chamfering.

One of the objects of the present invention is to provide a novel rotary cutter head for internal boring which is adapted to perform both roughing and finishing in one operating cycle without removing the work from the supporting fixture.

Another object is to provide a new and improved rotary cutter head for internal boring operations in which no loading or unloading of the work fixture between roughing and finishing is required.

A further object is to provide a novel rotary cutter head having a plurality of boring tools arranged in axially and peripherally spaced relation and adapted to be adjusted radially to different circles of revolution of progressively increasing order, whereby a succession of roughing and semi-finishing cuts may be taken in one stroke of the cutter.

Another object is to provide a new and improved cutter head of the foregoing character having, in addition to the roughing and semi-finishing tools, a finishing tool and a counterboring tool adapted to be projected into cutting position at a pretermined point in the operating cycle.

A general object of the invention is to provide a novel rotary cutter head of the foregoing character in which the cutting thrusts are well balanced and which is simple and sturdy in construction.

Other objects and advantages will become apparent as the description proceeds.

In the accompanying drawings:

Figure 1 is a side elevational view of a rotary cutter head embodying the features of my invention.

Fig. 2 is a plan view.

Fig. 3 is an axial sectional view taken along line 3—3 of Fig. 2.

Fig. 4 is an outer end view.

Fig. 5 is a fragmentary detail sectional view taken along line 5—5 of Fig. 4.

Fig. 6 is a plan development of the tool layout.

Fig. 7 is a side elevational view of a modified form of rotary cutter head.

Fig. 8 is a plan view of the cutter head shown in Fig. 7.

Fig. 9 is an end view of the modified cutter head.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the rotary cutter head of Figs. 1 to 6, constituting one exemplary embodiment of the invention, comprises a main generally cylindrical body 10 adapted to be mounted on a suitable support for a rotary drive. In the present instance, one end of the body 10 is formed with a peripheral mounting flange 11 adapted to be secured by screws 12 to the nose or face plate of a rotary machine tool spindle 13. A coaxial pilot 14 on the inner end of the body 10 is adapted to enter a recess 15 in the end face of the spindle 13 to locate the cutter head in correct position. Suitable arcuate recesses 16 are formed in the periphery of the body 10 contiguous to the mounting flange 11 to afford convenient access to the screws 12.

Removably secured to the outer or forward end of the body 10 is a circular tool block 17 of slightly smaller diameter. The block 17 is secured in coaxial relation to the main body 10 by means of a plurality of screws 18.

Mounted in peripherally spaced relation in the outer end of the tool block 17 and projecting radially therefrom are a plurality of suitable fixed boring tools. In the present instance, four such tools 19, 20, 21 and 22 are provided. Each of these tools is disposed for independent radial adjustment in a bore 23 (see Fig. 5). To afford convenient means for effecting adjustment, the inner end of each tool is formed with a cone 24 adapted for engagement by a cone 25 on the inner end of an adjusting screw 26 threaded from the outer end face of the tool block 17 into the bore 23. A set screw 27 is provided to secure the tool in adjusted position.

Referring to Figs. 4 and 6, the tools 19 to 22 are adapted to be adjusted in the order of their ascending numbers to progressively increasing circles of revolution, and are spaced progressively inwardly in the same order from the outer end face of the tool block 17 so that when the cutter head is moved through the work W, they will take successive cuts in the work bore B. The spacing of the tools axially of the cutter head can be comparatively close, for example .033 of an inch between consecutive tools. When arranged in this manner, the tools 19, 20 and 21 are roughing cutters and the fourth tool 22 is a semi-finishing cutter. The amount of stock removed by the successive cutters is approximately equal and the cutting forces on the head are substantially balanced.

The rotary cutter head also includes a finishing tool 28 and a counterboring tool 29 which are adapted to be retracted radially out of cutting position during the roughing and semi-finishing boring operation and to be projected outwardly into cutting position beyond the circle of revolution of the semi-finishing tool 22 to perform a final finishing boring operation and, if desired, a counterboring or chamfering operation.

The tools 28 and 29 are mounted on a holder 30 which in Figs. 1 to 4 comprises an L-shaped body having a shank 31 and a lateral head 32 on the outer end. The shank 31 is slidable in a guideway or groove 33 extending transversely and substantially diametrically through the outer end portion of the body 10, and is slidably confined therein by the tool block 17. An axial bore 34 is formed in and extends through the body 10, and at its outer end intersects one side of the groove 33. The inner face of the block 17 is formed with a clearance recess 35 in axial alinement with the bore 34.

To provide means for adjusting the tool holder 30 into and out of cutting position, the shank 31 is formed in one side with a wide transverse notch recess 36, and the root surface of the recess is formed with a diagonal or inclined cam or wedge groove 37. Extending axially through the spindle 13 and slidably through a bushing in the bore 34 is a shifter member 38 in the form of a cylindrical plunger adapted to be connected by an actuating rod 39 to a suitable operating means (not shown). The shifter member 38 is cut away along one side along its outer end portion to provide a flat bearing face 40 in slidable engagement with the bottom surface of the recess 36. Preferably, the other side of the member 38 is also partially cut away to provide an opposite flat bearing face 41 in slidable engagement with one side of the groove 33. An inclined rib or tongue 42 is formed on the face 40, and slidably engages in the groove 37. It will be evident that upon axial movement of the shifter member 38 in a forward direction, the tongue 42 through engagement with the groove 37 will project the tool holder 30 outwardly, and, upon movement of the member in the reverse direction, the tongue will retract the tool holder inwardly into inoperative position.

To limit the outward movement of the tool holder 30, a cross pin 43 is secured with a press fit in the shank 31, and projects at one end into a recess 44 opening to the bottom of the groove 33. An adjusting screw 45 is threaded through a radial opening 46 to extend into the recess 44 in the path of the pin 43, and serves as a stop to adjustably limit the outward movement of the tool holder 30, and thereby to define the operative cutting position of the tools 28 and 29. The screw 45 may be secured against misadjustment by means of a lock screw 47.

The finishing tool 28 is adjustably mounted in the forward or outer end of the head 32 which is slidable in a notch in the periphery of the tool block 17. More particularly, the tool 28 has a cylindrical shank 48 slidable in a bore 49 in the head 32 and formed on its inner end with a cone 50. An adjusting screw 51 is threaded from the end of the head 32 transversely into the bore 49, and has a cone 52 engaging the cone 50. The tool 28 is located substantially in the same transverse plane as the semi-finishing tool 22 and may be secured in adjusted position by means of a set screw 53.

In the form of Figs. 1 to 6, the counterboring tool 29 is mounted on the holder 30 for movement with the tool 28 into and out of cutting position. The tool 29 is formed on a generally rectangular block 54 mounted in a groove 55 in the head 32 for selective adjustment longitudinally to determine the axial spacing from the tool 28, and also radially to determine the diameter of cut. To provide for such adjustments, two screws 56 and 57 are threaded radially through opposite ends of the block 54 into engagement with the bottom of the groove 55. A clamp screw 58 extends through a longitudinal slot 59 into threaded engagement with the head 32 of the holder 30. Another screw 60 is threaded through one end of the head 32 into engagement with the adjacent end of the block 54. It will be evident that upon releasing the screw 58, the screws 56 and 57 may be adjusted to locate the tool 29 in the desired radial position. Also, the screw 60 may be adjusted to locate the tool 29 in the desired longitudinal position. Two additional clamp screws 61 are threaded through one side of the head 32 into engagement with one side of the block 54 and when tightened serve to lock the tool 29 in position of adjustment.

In operation, the rotary cutter head is advanced axially through the bore B of the work W to be bored. In the initial forward stroke, the shifter member 38 is held in relative withdrawn position, so that the finishing tool 28 and the counterboring tool 29 are in retracted or inoperative position and do not contact the work. Consequently, the first, second and third roughing tools or cutters 19, 20 and 21, and the semi-finishing tool or cutter 22, simultaneously take four successive step cuts in the bore B. At the end of the first stroke, the rotary cutter head is withdrawn from the work. Thereafter, the shifter member 38 is actuated in a forward direction to project the finishing tool 28 and the counterboring tool 29 into operative cutting position as defined by engagement of the pin 43 with the stop screw 45. The rotary cutter head is now advanced through the bore B of the work W in a second stroke, during which the finishing tool 28 only takes a light finishing cut. As the cutter head nears the end of its second forward stroke, the counterboring tool 29 cuts a counterbore C in one end of the bore B. The shifter member 38 now is again actuated to retract the tools 28 and 29 into inoperative position, and the cutter head is withdrawn from the work without any of the tools contacting the finished surface of the bore B.

In an optional cycle of operation, the shifter member 38 may be actuated to project the tools 28 and 29 into operative position near the end of the initial cutting stroke, and after the tools 19 to 22 have taken their respective cuts through the bore B. In the final forward movement, the tool 29 will then cut the counterbore C. Upon withdrawing the rotary cutter head back through the bore B, the finishing cutter 28 will take a light finishing cut in the bore B.

It will be evident that the rotary cutter head serves to take a succession of roughing and finishing cuts, as well as a counterboring cut, in one cycle of operation, and without requiring loading or unloading of the work between roughing and finishing. After the finishing cut, the tools do not again contact the finished surface.

The modified form of rotary cutter head disclosed in Figs. 7, 8 and 9 is generally similar to that disclosed in Figs. 1 to 6, and hence corresponding parts are identified by the same reference numerals with the addition of the letter "a." In this form, the counterboring tool 29a is not mounted on the retractable tool holder, but is adjustably secured in fixed position within a slot or groove 55a in the periphery of the body 10a. The block 54a of the tool 29a is adjustable radially by means of screws 56a and 57a, and longitudinally by means of the screw 60a, and is adapted to be clamped in position of adjustment by lock screws 58a and 61a.

The roughing and semi-finishing cutters 19a to 22a are mounted directly in the free end of the body 10a instead of in a tool block, and the body is formed in its outer end with an axial bore 62 into which the shifter member 38a extends. The finishing tool 28a is mounted in an outer horizontal arm of a bell crank lever 63 mounted in a slot 64 for oscillation about a pivot 65. A stop pin 66 is anchored in the body 10a and extends through the slot 64 and through a large opening 67 in the outer arm of the lever 63.

The lever 63 has an inwardly extending arm 68 which encircles a reduced portion 69 of the shifter member 38a and is confined between two opposed abutments 70 and 71 thereon. Upon actuation of the shifter member 38a to the left, the lever 63 will be oscillated to retract the tool 28a into inoperative position. Upon actuation of the shifter member 38a to the right, the lever 63 will be oscillated to project the finishing tool 28a into operative cutting position as defined by engagement of the pin 66 with the inner side of the opening 67.

I claim as my invention:

1. A rotary cutter head comprising, in combination, a cylindrical body adapted to be mounted on a spindle for rotation and for axial reciprocation therewith, a plurality of boring tools projecting from the periphery of said body and being independently adjustable, said tools being peripherally and axially spaced in a helical series of progressively increased circles of revolution to adapt said tools for taking a simultaneous series of stepped boring cuts, a tool holder adjustably mounted in said body and supporting a finish boring tool and a counterboring tool in spaced relation along the cutter axis, and means operable to shift said holder selectively into cutting position beyond the range of said first mentioned tools or into inoperative position within the circumferential cutting range of said first mentioned tools.

2. A rotary cutter head comprising, in combination, a body adapted to be mounted on a spindle for rotation and for axial reciprocation therewith, a plurality of roughing boring tools projecting radially from said body and being independently adjustable, said tools being peripherally and axially spaced in a helical series of progressively increased circles of revolution to adapt said tools for taking a simultaneous series of stepped boring cuts in a forward stroke of said head, a tool holder adjustably mounted in said body and supporting a finish boring tool, and means operable to shift said holder reversibly to project said finish boring tool radially into cutting position beyond the range of said first mentioned tools or to retract said finish boring tool into inoperative position.

3. A rotary cutter head comprising, in combination, a cylindrical body adapted to be mounted on a spindle for rotation and for axial reciprocation therewith and formed with a plurality of like sockets opening to the periphery thereof, a plurality of like boring tools disposed in said sockets and projecting from the periphery of said body and being independently adjustable therein to different radial positions, said sockets being peripherally and axially spaced so that said tools are arranged in a helical series of progressively increased circles of revolution to adapt said tools for taking a simultaneous series of stepped boring cuts in the cutting stroke of said head, and a finishing tool mounted on said body at the inner end of said series of tools and being selectively movable into projected position with a greater circle of revolution than said first mentioned tools or into retracted position with a lesser circle of revolution than said first mentioned tools.

4. A rotary cutter head comprising, in combination, a body to be supported for rotation and formed in the outer end with a transverse groove, a tool block secured to one end of said body, a plurality of roughing boring tools and a semi-finishing boring tool projecting radially from said block and being independently adjustable, said tools being peripherally and axially spaced in a helical series of progressively increased circles of revolution to adapt said tools for taking a simultaneous series of stepped boring cuts, a tool holder having a shank adjustably mounted in said groove and having a cross head at the outer end supporting a radial cutting tool, and means operable to shift said shank radially outwardly to project said cutting tool into cutting position or radially inwardly to retract said cutting tool into inoperative position.

5. A rotary cutter head comprising, in combination, a rotary body, a roughing cutting tool adjustably mounted in fixed position in said body and projecting radially therefrom, a tool holder mounted in said body for radial adjustment, a finishing cutting tool mounted in said holder substantially in the transverse plane of said roughing tool, a third cutting tool mounted in said holder in spaced relation to said finishing tool axially of said body, and means for reversibly adjusting said holder.

6. A rotary cutter head comprising, in combination, a rotary body, a roughing cutting tool adjustably mounted in fixed position in said body and projecting radially therefrom, a tool holder mounted in said body for radial adjustment, a finishing cutting tool mounted in said holder substantially in the transverse plane of said roughing tool, a third cutting tool mounted in said holder in spaced relation to said finishing tool axially of said body and being independently adjustable in said holder both radially and longitudinally of said body, and means operable to shift said holder either outwardly to project said finishing tool and said third tool into cutting position or inwardly to retract said last two mentioned tools out of cutting position.

7. A rotary cutter head comprising, in combination, a rotary cutter body formed in one end with a diametrical guideway and in the other end with an axial bore opening to said guideway, a tool holder slidably confined in said guideway and being formed intermediate its ends in one side with a wedge groove inclined to the axis of rotation, a reciprocable shifter member extending through said bore into said guideway and having an inclined wedge key on one side slidably engaging in said groove, adjustable stop means for limiting the outward movement of said holder radially of said body whereby axial adjustment of said shifter member in opposite directions will project said holder into a predetermined operative cutting position or retract said holder into an idle position, a cross head on the outer end of said holder extending longitudinally of said body, a boring tool adjustably mounted in one end of said head and projecting radially from said body, and a radially projecting counterboring tool mounted in said head for adjustment both radially and longitudinally of said body.

8. A rotary cutter head comprising, in combination, a rotary cutter body formed with a diametrical guideway and with an axial bore opening to said guideway, a tool holder slidably confined in said guideway and being formed intermediate its ends in one side with a wedge groove inclined to the axis of rotation, a reciprocable shifter member extending axially through said bore into said guideway and having an inclined wedge key on one side slidably engaging in said groove, adjustable stop means acting directly on said holder for limiting the outward movement of said holder radially of said body whereby axial adjustment of said shifter member in opposite directions will project said holder into a predetermined operative cutting position or retract said holder into an idle position, and a cutting tool adjustably mounted in the outer end of said holder.

9. A rotary cutter head comprising, in combination, a rotary cutter body formed with a guideway and an axial bore, a bellcrank lever pivotally mounted in said guideway and having an outer arm extending generally longitudinally of said body and a generally radial arm extending into said bore, a reciprocable shifter member extending axially through said bore and connected to the inner end of said radial arm, stop means for limiting the outward swinging movement of said longitudinal arm radially of said body, whereby axial adjustment of said shifter member in opposite directions will project said longitudinal arm into a predetermined cutting operative position or retract said longitudinal arm into an idle position, and a cutting tool adjustably mounted in the free end of said longitudinal arm and projecting radially from said body.

10. A rotary cutter head comprising, in combination, a rotary cutter body formed with a guideway and an axial bore, a bell-crank lever pivotally mounted in said guideway and having an outer arm extending generally longitudinally of said body and a generally radial arm extending into said bore, a reciprocable shifter member extending axially through said bore and connected to the inner end of said radial arm, stop means for limiting the outward swinging movement of said longitudinal arm radially of said body, whereby axial adjustment of said shifter member in opposite directions will project said longitudinal arm into a predetermined cutting operative position or retract said longitudinal arm into an idle position, a cutting tool adjustably mounted in the free end of said longitudinal arm and projecting radially from said body, and a plurality of cutting tools mounted in fixed position on said body in peripherally and axially spaced relation in advance of said first mentioned tool and projecting progressively increasing radial distances from said body.

11. A rotary cutter head comprising, in combination, a rotary cutter body formed with a guideway and an axial bore, a bell-crank lever pivotally mounted in said guideway and having an outer arm extending generally longitudinally of said body and a generally radial arm extending into said bore, a reciprocable shifter member extending axially through said bore and connected to the inner end of said radial arm, stop means for limiting the outward swinging movement of said longitudinal arm radially of said body, whereby axial adjustment of said shifter member in opposite directions will project said longitudinal arm into a predetermined cutting operative position or retract said longitudinal arm into an idle position, a cutting tool adjustably mounted in the free end of said longitudinal arm and projecting radially from said body, a plurality of cutting tools mounted in fixed position on said body in peripherally and axially spaced relation in advance of said first mentioned tool and projecting progressively increasing radial distances from said body, and another tool on said body trailing said first mentioned tools and being adjustable independently radially and longitudinally of said body.

12. A rotary cutter head comprising, in combination, a rotary cutter body formed with a transverse groove in one end and with an axial bore opening through the other end to said groove, a tool block removably secured to said one end of said body and being formed in the periphery with a radial groove in registration with said transverse groove, a plurality of cutting tools mounted in and projecting radially from said block in peripherally spaced relation, a tool holder having a shank slidably disposed in said transverse groove and confined therein by said block, said holder having a cross head at one outer end slidably disposed in said transverse and radial grooves for radial adjustment, a cutting tool adjustably mounted in said cross head, and means extending slidably through said bore into said transverse groove and having an inclined wedge engagement with said shank to adjust the radial position of said holder.

13. A rotary cutter head comprising, in combination, a rotary cutter body formed with a transverse groove in one end and with an axial bore opening through the other end to said groove, a tool block removably secured to said one end of said body and being formed in the periphery with a radial groove in registration with said transverse groove, a plurality of cutting tools mounted in and projecting radially from said block in peripherally spaced relation, a tool holder having a shank slidably disposed in said transverse groove and confined therein by said block, said holder having a cross head at one outer end slidably disposed in said transverse and radial grooves for radial adjustment, a cutting tool adjustably mounted in said cross head, and means extending slidably through said bore into said transverse groove and having an inclined wedge engagement with said shank to adjust the radial position of said holder, all of said tools being disposed to cut in the same direction of movement of said cutter head relative to the work.

14. A rotary cutter head comprising, in combination, a rotary cutter body formed with a transverse groove in one end and with an axial bore opening through the other end to said groove, a tool block removably secured to said one end of said body and being formed in the periphery with a radial groove in registration with said transverse groove, a plurality of cutting tools mounted in and projecting radially from said block in peripherally spaced relation, a tool holder having a shank slidably disposed in said transverse groove and confined therein by said block, said holder having a cross head at one outer end slidably disposed in said transverse and radial grooves for radial adjustment, a cutting tool adjustably mounted in said cross head, means extending slidably through said bore into said transverse groove and having an inclined wedge engagement with said shank to adjust the radial position of said holder, a stop pin carried by said holder and projecting from one side thereof, and a stop screw adjustably threaded in said body and located in the path of said pin to limit the outward movement of said holder.

15. A rotary cutter head comprising, in combination, a rotary cutter body formed with a diametrical guideway in one end portion and a radial groove in registration with said guideway and extending from said guideway longitudinally to the extreme end of said portion, and with an axial bore opening through the other end portion to said guideway, a plurality of cutting tools mounted in and projecting radially from said body in peripherally spaced relation, a tool holder having a shank slidably disposed in said guideway and having a cross head at one outer end slidably disposed in said groove for radial adjustment, a cutting tool adjustably mounted in said cross head, and means extending slidably through said bore into said guideway and having an operative connection with said shank to adjust the radial position of said holder.

16. A rotary cutter head comprising, in combination, a rotary cutter body formed with a diametrical guideway and with an axial bore opening to said guideway, a tool holder slidably confined in said guideway for limited radial movement in normal operation and being formed intermediate its ends with a transverse wedge surface longitudinally inclined to the axis of rotation, a reciprocable shifter member extending axially through said bore into said guideway and having an inclined wedge surface complemental to and slidably engaging said first mentioned surface, means for maintaining said surfaces in sliding contact during movement of said shifter member in either direction, adjustable lost-motion stop means acting directly on said holder for limiting the outward movement of said holder radially of said body, whereby axial movement of said shifter member in opposite directions will project said holder into a predetermined operative cutting position or retract said holder into an idle position, and a cutting tool adjustably mounted in the outer end of said holder.

CURTIS T. DARE.